United States Patent Office 2,883,431
Patented Apr. 21, 1959

2,883,431

PROCESS FOR CATALYTIC SEMI-HYDROGENATION OF TERTIARY ACETYLENIC MONOHYDRIC ALCOHOLS

George O. Chase, Hawthorne, and Julius Galender, West Paterson, N.J., assignors to Hoffmann-La Roche Inc., Nutley, N.J., a corporation of New Jersey No Drawing. Application July 17, 1956
Serial No. 598,231

9 Claims. (Cl. 260—642)

This invention relates to an improvement in a process for making chemical compounds by catalytic hydrogenation. More particularly, it relates to an improved process for making certain ethylenic carbinols by catalytic hydrogenation of the corresponding acetylenic carbinols in the presence of a specified amount of quinoline. It has been found that the employment of quinoline according to the teachings of the invention greatly increases the rate of hydrogen uptake, increases the selectivity of hydrogenation, reduces the catalyst requirement, prolongs the useful life of the catalyst, and facilitates isolation of the desired hydrogenation product.

In a broad aspect, the invention provides a process for making an olefinic compound having the formula (I)    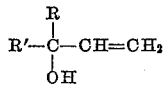

wherein each of the symbols R and R' represents a hydrocarbon radical having not more than seven carbon atoms, which comprises catalytically hydrogenating an acetylenic compound of the formula (II)    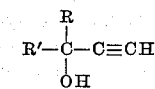

wherein the symbols R and R' respectively represent the same radicals as in Formula I above, dissolved in quinoline in an amount of from about 10% by weight to about 20% by weight of said acetylenic compound (II).

Examplary of the tertiary acetylenic carbinols of Formula II above which can be hydrogenated by the processes of the invention are:

2-methyl-3-butyn-2-ol
   3-methyl-1-pentyn-3-ol
   3-ethyl-1-pentyn-3-ol
   3,5-dimethyl-1-hexyn-3-ol
   2-phenyl-3-butyn-2-ol and the like; which yield respectively, by the processes of the invention, the following tertiary olefinic carbinols of Formula I:

2-methyl-3-buten-2-ol
   3-methyl-1-penten-3-ol
   3-ethyl-1-penten-3-ol
   3,5-dimethyl-1-hexen-3-ol
   2-phenyl-3-buten-2-ol As indicated above, in the processes of the invention the quinoline is employed in a proportion of from about 10% to about 20% by weight of the tertiary acetylenic carbinol (II) which is to be hydrogenated. In the case of 2-methyl-3-butyn-2-ol, a preferred proportion is from about 13% by weight to about 15% by weight of quinoline, with reference to said methylbutynol; and still more preferably, the quinoline is used in an amount of about 15% by weight of said methylbutynol. It should be understood that amounts of quinoline greater than those recited as maxima in the ranges indicated above may be employed if desired, but such excess quinoline serves merely as a diluent, and needlessly takes up the capacity of the hydrogenation equipment. Whereas the use of excess quinoline does not effect further improvement in the process, and indeed ordinarily constitutes pro tanto an economic waste, the presence of quinoline over and above the recited upper limits should not be viewed as being beyond the scope of the invention.

Preferred hydrogenation catalysts for use in the processes of the invention are those which selectively influence the hydrogenation of an acetylenic linkage to the olefinic stage only. Catalysts of this class are known to those skilled in the art, illustrative members being disclosed, for example, by Lindlar in Helvetica Chimica Acta 35, 446–450 (1952) and in U.S. Patent 2,681,938. Particularly preferred is the 5% palladium-on-calcium carbonate catalyst modified by deposition of lead thereon, speecifically disclosed by Lindlar at page 450 of the cited publication in Helvetica Chimica Acta: in which case the catalyst is preferably used in an amount by weight of from about 0.5% to about 3%, based upon the weight of acetylenic carbinol to be hydrogenated. In the case of 2-methyl-3-butyn-2-ol, and using the preferred 5% palladium-on-calcium carbonate-lead catalyst referred to above, the catalyst is preferably used in an amount of from about 0.5% to about 0.7% by weight, and still more preferably about 0.6% by weight, of said methylbutynol. If the catalyst is employed in amounts materially below the minima recited in the above indicated ranges, there is a corresponding sacrifice in the rate of hydrogenation; if employed in amounts materially exceeding the recited maxima, there is a corresponding sacrifice in the selectivity of hydrogenation and hence in the overall yield.

The hydrogenation is preferably effected at temperatures between about 0° C. and about 25° C.; in the case of 2-methyl-3-butyn-2-ol, preferably between about 15° C. and about 20° C., and still more preferably, at about 15° C. The hydrogenation reaction is exothermic. The preferred temperature ranges of the processes of the invention, however, are readily attainable by means of the cooling facilities conventionally available in commercial hydrogenation plants.

Only very moderate hydrogen overpressures are necessary in effecting the processes of the invention. It is preferred to operate at hydrogen pressures not exceeding about 5 p.s.i. gauge; although if it is so desired, the reaction can be run at hydrogen pressures as high as about 25 p.s.i. gauge. In the case of 2-methyl-3-butyn-2-ol, the preferred operating range of hydrogen pressure is from about 2 p.s.i. gauge to about 3 p.s.i. gauge.

The products of Formula I produced by the processes of the invention are not generically novel, and are not claimed as part of the present invention. These products are useful as intermediates in the preparation of odorants for incorporation in perfume compositions.

The invention is further disclosed in the following examples, which are illustrative but not limitative thereof.

*Example 1*

In a 2-liter hydrogenator was placed 1000 g. of 2-methyl-3-butyn-2-ol, 150 g. of quinoline, and 6.25 g. of 5% palladium-on-calcium carbonate catalyst modified by deposition of lead thereon as specifically disclosed by Lindlar, Helvetica Chimica Acta 35, at page 450 (1952). The hydrogenator was flushed with nitrogen in order to remove oxygen, and was cooled with water to a temperature of 15° C. The agitator was started and hydrogen was introduced under a pressure of 3 p.s.i. gauge, while maintaining the temperature at 15° C. When the rate of hydrogen uptake dropped suddenly, aliquots were removed from the reaction mixture; the hydrogenation was continued until a test of an aliquot with ammoniacal silver nitrate indicated absence of acetylenic unsaturation. The supply of hydrogen was then terminated, and the contents of the hydrogenator were transferred to a still. The charge was distilled through a fractionating column under atmospheric pressure. The hydrogenation product, 2-methyl-3-buten-2-ol, was recovered in a fraction having a boiling range 97° C.–99° C./760 mm., $n_D^{25}$=1.4140 to 1.4142, as a clear, colorless liquid having a pleasant, faintly camphoric odor. After removal of this fraction in the overhead, the residue in the still pot was filtered: the catalyst, recovered on the filter, being retained for use in hydrogenating the next batch; and the quinoline, in the filtrate, also being recycled for reuse in the next batch.

*Example 2*

In a hydrogenator was placed 98.1 g. of 3-methyl-1-pentyn-3-ol, 16.2 g. of quinoline and 2.0 g. of the same 5% palladium-on-calcium carbonate-lead catalyst employed in Example 1. The hydrogenator was flushed with nitrogen, the agitator was started, and hydrogen was introduced under a pressure of 3 p.s.i. gauge. The rate of cooling was so adjusted that at the beginning of the hydrogenation the temperature of the reaction mixture was 5° C., but the temperature was allowed to increase slowly so that the major part of hydrogenation was conducted at 15° C. Hydrogenation was continued until the uptake of hydrogen ceased; a test for acetylenic unsaturation at that time was negative. The reaction mixture was filtered in order to remove the catalyst, and the filtrate was fractionated. 3-methyl-1-penten-3-ol was obtained in a fraction having B.P. 115° C./760 mm.; $n_D^{25}$=1.4259–1.4260.

*Example 3*

In a hydrogenator was placed 126.2 g. of 3,5-dimethyl-1-hexyn-3-ol, 20.8 g. of quinoline and 2.5 g. of the same palladium-on-calcium carbonate-lead catalyst employed in Example 1. The hydrogenator was flushed with nitrogen, the agitator was started, and hydrogen was introduced under a pressure of 3 p.s.i. gauge, while maintaining the temperature at 15° C. When the uptake of hydrogen ceased, the supply of hydrogen was interrupted. The catalyst was filtered from the reaction mixture, and the filtrate was fractionally distilled under reduced pressure. 3,5-dimethyl-1-hexen-3-ol was recovered in a fraction having B.P. 63°–64° C./25 mm.; $n_D^{25}$=1.4315–1.4319

We claim:

1. A process of making an olefinic compound having the formula

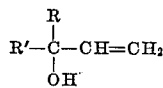

which comprises reacting an acetylenic compound having the formula

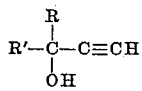

with elemental hydrogen in the presence of a supported palladium-lead hydrogenation catalyst selective to influence the hydrogenation of an acetylenic linkage preferentially to the olefinic stage, said acetylenic compound being dissolved in a solvent consisting essentially of quinoline in an amount of from about 10% by weight to about 20% by weight of said acetylenic compound; wherein, in the foregoing formulas, the symbol R represents a hydrocarbon radical having not more than seven carbon atoms, and the symbol R′ represents a hydrocarbon radical having not more than seven carbon atoms.

2. A process of making an olefinic compound having the formula

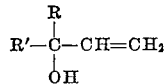

which comprises reacting an acetylenic compound having the formula

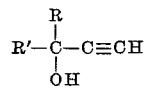

dissolved in quinoline in an amount from about 10% by weight to about 20% by weight of said acetylenic compound, with elemental hydrogen in the presence of a selective supported palladium-lead hydrogenation catalyst, under a hydrogen pressure not greater than about 25 p.s.i. gauge and at a temperature in the range between about 0° C. and about 25° C.; wherein, in the foregoing formulas, the symbol R represents a lower alkyl radical, and the symbol R′ represents a hydrocarbon radical having not more than seven carbon atoms selected from the group consisting of lower alkyl radicals and monocyclic hydrocarbon radicals.

3. A process of making an olefinic compound having the formula

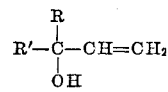

which comprises reacting an acetylenic compound having the formula

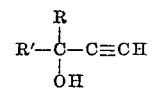

dissolved in quinoline in an amount from about 10% by weight to about 20% by weight of said acetylenic compound, with elemental hydrogen in the presence of a selective supported palladium-lead hydrogenation catalyst, under a hydrogen pressure not greater than about 25 p.s.i. gauge and at a temperature in the range between about 0° C. and about 25° C.; wherein, in the foregoing formulas, the symbol R represents a lower alkyl radical, and the symbol R′ represents a lower alkyl radical.

4. A process of making 2-methyl-3-buten-2-ol which comprises reacting a solution consisting essentially of 2-methyl-3-butyn-2-ol and quinoline in an amount from about 10% by weight to about 20% by weight of said methylbutynol, with elemental hydrogen, in the presence of a 5% palladium-on-calcium carbonate catalyst on which lead has been deposited to make the catalyst more selective, said catalyst being present in an amount from about 0.5% by weight to about 3% by weight of said methylbutynol, at a temperature in the range from about 0° C. to about 25° C. and under a hydrogen pressure not exceeding about 25 p.s.i. gauge.

5. A process of making 2-methyl-3-buten-2-ol which comprises reacting a solution consisting essentially of 2-methyl-3-butyn-2-ol and quinoline in an amount from about 13% by weight to about 15% by weight of said methylbutynol, with elemental hydrogen, in the presence of a 5% palladium-on-calcium carbonate catalyst on which lead has been deposited to make the catalyst more selective, said catalyst being present in an amount from about 0.5% by weight to about 0.7% by weight of said methylbutynol, at a temperature between about 15° C. and about 20° C., and under a hydrogen pressure not exceeding about 5 p.s.i. gauge.

6. A process of making 2-methyl-3-buten-2-ol which comprises reacting a solution consisting essentially of 2-methyl-3-butyn-2-ol and quinoline in an amount approximately 15% by weight of said methylbutynol, with elemental hydrogen, in approximately equimolar proportion to said methylbutynol, in the presence of a 5% palladium-on-calcium carbonate catalyst on which lead has been deposited to make the catalyst more selective, said catalyst being present in an amount approximately 0.6% by weight of said methylbutynol, at a temperature of about 15° C., and under a hydrogen pressure from about 2 p.s.i. gauge to about 3 p.s.i. gauge.

7. A process of making 3-ethyl-1-penten-3-ol which comprises reacting a solution consisting essentially of 3-ethyl-1-pentyn-3-ol and quinoline in an amount from about 10% by weight to about 20% by weight of said ethylpentynol, with elemental hydrogen, in the presence of a 5% palladium-on-calcium carbonate catalyst on which lead has been deposited to make the catalyst more selective, said catalyst being present in an amount from about 0.5% by weight to about 3% by weight of said ethylpentynol, at a temperature in the range from about 0° C. to about 25° C., and under a hydrogen pressure not exceeding about 25 p.s.i. gauge.

8. A process of making 3,5-dimethyl-1-hexen-3-ol which comprises reacting a solution consisting essentially of 3,5-dimethyl-1-hexyn-3-ol and quinoline in an amount from about 10% by weight to about 20% by weight of said dimethylhexynol, with elemental hydrogen, in the presence of a 5% palladium-on-calcium carbonate catalyst on which lead has been deposited to make the catalyst more selective, said catalyst being present in an amount from about 0.5% by weight to about 3% by weight of said dimethylhexynol, at a temperature in the range from about 0° C. to about 25° C. and under a hydrogen pressure not exceeding about 25 p.s.i. gauge.

9. A process which comprises reacting a solution consisting essentially of 2-methyl-3-butyn-2-ol and quinoline in an amount from about 10% by weight to about 20% by weight of said methylbutynol, with elemental hydrogen, in the presence of a palladium-on-calcium carbonate hydrogenation catalyst on which lead has been deposited to make the catalyst more selective, at a temperature in a range from about 0° C. to about 25° C. and under a hydrogen pressure not exceeding about 25 p.s.i. gauge, thereby forming 2-methyl-3-buten-2-ol; and distilling off 2-methyl-3-buten-2-ol from the hydrogenation mixture at about atmospheric pressure.

References Cited in the file of this patent

UNITED STATES PATENTS

| Number | Name | Date |
|---|---|---|
| 2,267,749 | Reppe | Dec. 30, 1941 |
| 2,516,826 | Smith | July 25, 1950 |
| 2,529,498 | Isler | Nov. 14, 1950 |
| 2,657,219 | Isler | Oct. 27, 1953 |
| 2,681,938 | Lindlar | June 22, 1954 |
| 2,806,885 | Isler | Sept. 17, 1957 |